US012563474B2

(12) United States Patent
Zhang

(10) Patent No.: US 12,563,474 B2
(45) Date of Patent: Feb. 24, 2026

(54) DATA TRANSMISSION METHOD AND RELATED DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventor: Zhuoyun Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 18/337,999

(22) Filed: Jun. 20, 2023

(65) Prior Publication Data

US 2023/0337108 A1     Oct. 19, 2023

Related U.S. Application Data

(63) Continuation of application No. PCT/CN2022/136982, filed on Dec. 6, 2022.

(30) Foreign Application Priority Data

Jan. 11, 2022     (CN) .......................... 202210028779.2

(51) Int. Cl.
| *H04W 48/18* | (2009.01) |
| *H04W 40/12* | (2009.01) |
| *H04W 40/20* | (2009.01) |

(52) U.S. Cl.
CPC ........... *H04W 40/20* (2013.01); *H04W 40/12* (2013.01)

(58) Field of Classification Search
CPC ....... H04L 45/306; H04L 45/85; H04L 67/34; H04L 2101/375; H04W 28/0831;
(Continued)

(56) References Cited

U.S. PATENT DOCUMENTS

| 12,127,106 B2 * | 10/2024 | Ninglekhu ............ H04W 40/02 |
| 12,167,500 B2 * | 12/2024 | Di Girolamo .......... H04W 8/24 |
(Continued)

FOREIGN PATENT DOCUMENTS

| CN | 110972217 A | 4/2020 |
| CN | 113225836 A | 8/2021 |
(Continued)

OTHER PUBLICATIONS

OPPO, URSP rule for satellite access, 3GPP TSG SA WG2 Meeting #144E, Elbonia, S2-2102556, 5 pages, Apr. 12-16, 2021.*
(Continued)

*Primary Examiner* — Frank Duong
(74) *Attorney, Agent, or Firm* — Sughrue Mion, PLLC

(57)     ABSTRACT

Provided are a method, apparatus, a non-transitory computer-readable storage medium for data transmission in a 5G communication system. The process may include generating a UE route selection policy (URSP), the URSP comprising a URSP rule, the URSP rule comprising a route selection descriptor (RSD), the RSD comprising satellite access indication information, and the satellite access indication information indicating that a terminal selects a satellite access mode to access a core network; and transmitting the URSP to the terminal through a second network element.

18 Claims, 6 Drawing Sheets

(58) Field of Classification Search

CPC ......... H04W 28/0865; H04W 28/0925; H04W 40/02; H04W 40/026; H04W 40/12; H04W 40/18; H04W 40/20; H04W 40/24; H04W 40/248; H04W 48/18; H04W 60/04; H04W 76/10; H04W 76/11; H04W 76/12; H04W 76/18; H04W 80/10; H04W 84/06

See application file for complete search history.

(56) References Cited

U.S. PATENT DOCUMENTS

| | | | | |
|---|---|---|---|---|
| 12,231,992 | B2 * | 2/2025 | Xiong | H04W 76/40 |
| 12,279,157 | B2 * | 4/2025 | Ly | H04W 8/04 |
| 2019/0268835 | A1 | 8/2019 | Shan et al. | |
| 2022/0264503 | A1 * | 8/2022 | Starsinic | H04L 63/08 |
| 2022/0322202 | A1 * | 10/2022 | Li | H04M 15/93 |
| 2024/0381219 | A1 * | 11/2024 | Tonesi | H04W 40/02 |

FOREIGN PATENT DOCUMENTS

| | | |
|---|---|---|
| CN | 113810973 A | 12/2021 |
| WO | 2022/160123 A1 | 8/2022 |

OTHER PUBLICATIONS

OPPO. "URSP rule for satellite access", 3GPP TSG SA WG2 Meeting #144E S2-2102556, Apr. 16, 2021, pp. 1-5.

International Search Report for PCT/CN2022/136982 dated Feb. 13, 2023.

Written Opinion for PCT/CN2022/136982 dated Feb. 13, 2023.

Office Action dated Dec. 30, 2025, issued in Chinese Patent Application No. 202210028779.2.

* cited by examiner

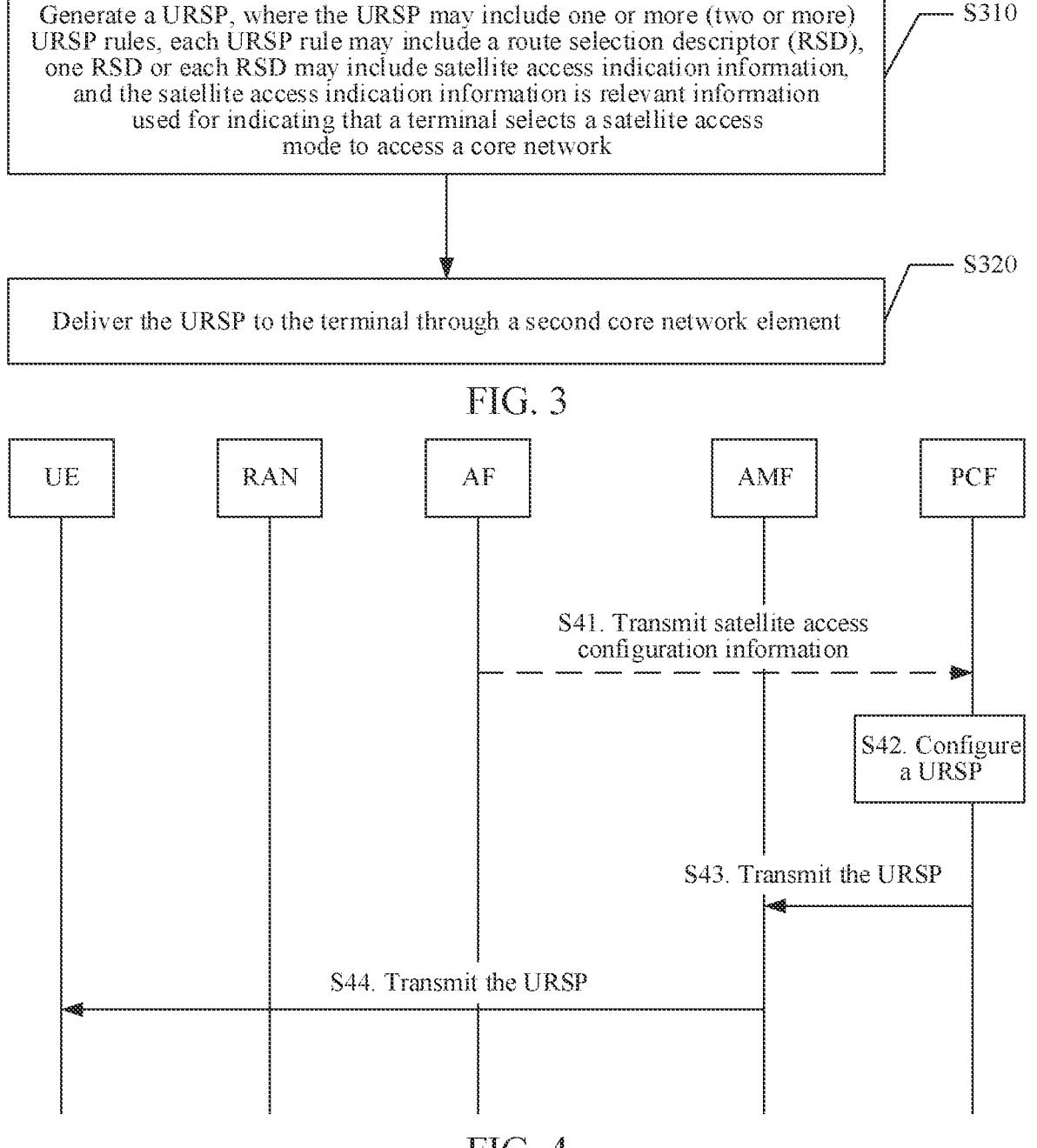

Generate a URSP, where the URSP may include one or more (two or more)
URSP rules, each URSP rule may include a route selection descriptor (RSD),
one RSD or each RSD may include satellite access indication information,
and the satellite access indication information is relevant information
used for indicating that a terminal selects a satellite access
mode to access a core network — S310

Deliver the URSP to the terminal through a second core network element — S320

FIG. 3

UE        RAN        AF        AMF        PCF

S41. Transmit satellite access
configuration information

S42. Configure
a URSP

S43. Transmit the URSP

S44. Transmit the URSP

FIG. 4

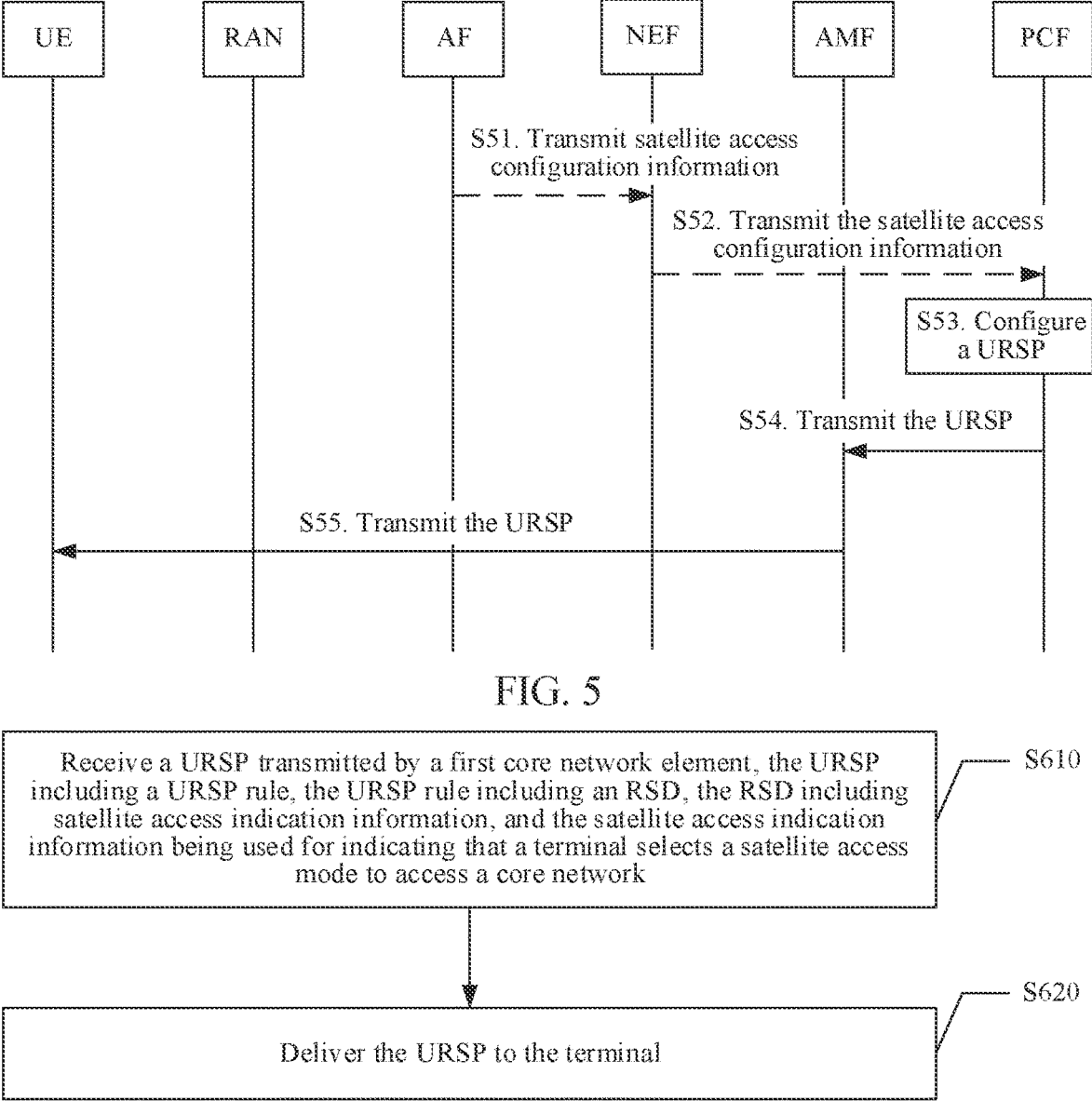

FIG. 5

Receive a URSP transmitted by a first core network element, the URSP including a URSP rule, the URSP rule including an RSD, the RSD including satellite access indication information, and the satellite access indication information being used for indicating that a terminal selects a satellite access mode to access a core network — S610

Deliver the URSP to the terminal — S620

Transmit satellite access configuration information to
a first core network element

Receive a URSP from a second core network element, the URSP including a
URSP rule, the URSP rule including a route selection descriptor (RSD),
and the RSD including satellite access indication information

S820

Access, according to the satellite access indication information in the RSD,
a core network through a satellite access mode

FIG. 8

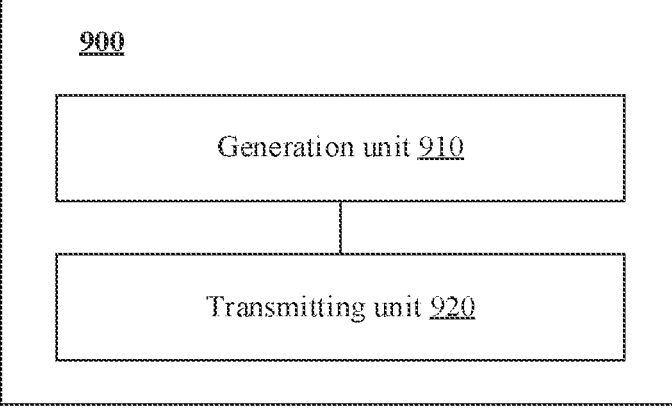

900

Generation unit 910

Transmitting unit 920

Transmitting unit 1110

1

DATA TRANSMISSION METHOD AND RELATED DEVICE, COMPUTER-READABLE STORAGE MEDIUM, AND COMPUTER PROGRAM PRODUCT

CROSS-REFERENCE TO RELATED APPLICATIONS

This application is a continuation of International Application No. PCT/CN2022/136982, filed with the China National Intellectual Property Administration on Dec. 6, 2022, which claims priority to Chinese Patent Application No. 202210028779.2 filed with the China National Intellectual Property Administration on Jan. 11, 2022, the disclosure of which are incorporated herein in their entireties.

FIELD

This disclosure relates to the field of communication technologies, and in particular, to a data transmission method, a first core network element, a second core network element, a third network element, a terminal, a communication device, a computer-readable storage medium, and a computer program product.

BACKGROUND

Satellite communication and 5th generation mobile communication technology (5G) communication are both important communication means used by people. However, a satellite communication system and a 5G communication system are two completely different communication systems. Apart from the difference between celestial communication and terrestrial communication, the main difference is that the technical systems of satellite communication and 5G communication are completely different. Due to the totally different technical systems, the types, formats, and transmission methods of control information and service data information transmitted in the satellite communication system and the 5G communication system are different.

However, in some application scenes and technical solutions, the wide area coverage capability of satellites is indispensable. For a new converged communication system, there is no solution for the policy control of how to select an access mode by a terminal and how to select an access mode by a network.

SUMMARY

An embodiment of the present disclosure relates to a method for data transmission method in a 5G communication network. The method may be executed by a first core network element and may include generating a UE route selection policy (URSP), the URSP comprising a URSP rule, the URSP rule comprising a route selection descriptor (RSD), the RSD comprising satellite access indication information, and the satellite access indication information indicating that a terminal selects a satellite access mode to access a core network; and transmitting the URSP to the terminal through a second network element.

An embodiment of the present disclosure relates to an apparatus for data transmission in a 5G communication network. The apparatus may include at least one memory configured to store program code; and at least one processor configured to read the program code and operate as instructed by the program code. The program code may include first generating code configured to cause the at least one first processor to generate a UE route selection policy (URSP), the URSP comprising a URSP rule, the URSP rule comprising a route selection descriptor (RSD), the RSD comprising satellite access indication information, and the satellite access indication information indicating that a terminal selects a satellite access mode to access a core network; and first transmitting code configured to cause the at least one first processor to transmit the URSP to the terminal through a second network element.

An embodiment of the present disclosure relates to a non-transitory computer-readable medium storing program code which, when executed by one or more processors of a device for data transmission in a 5G communication network, cause the one or more processors to at least generate a UE route selection policy (URSP), the URSP comprising a URSP rule, the URSP rule comprising a route selection descriptor (RSD), the RSD comprising satellite access indication information, and the satellite access indication information indicating that a terminal selects a satellite access mode to access a core network; and transmit the URSP to the terminal through a second network element.

BRIEF DESCRIPTION OF THE DRAWINGS

FIG. 3 schematically illustrates a flowchart of a data transmission method according to an embodiment of this disclosure.

FIG. 4 schematically illustrates a schematic interaction diagram of a data transmission method according to an embodiment of this disclosure.

FIG. 5 schematically illustrates a schematic interaction diagram of a data transmission method according to another embodiment of this disclosure.

FIG. 6 schematically illustrates a flowchart of a data transmission method according to another embodiment of this disclosure.

FIG. 7 schematically illustrates a flowchart of a data transmission method according to another embodiment of this disclosure.

FIG. 8 schematically illustrates a flowchart of a data transmission method according to another embodiment of this disclosure.

FIG. 9 schematically illustrates a block diagram of a first core network element according to an embodiment of this disclosure.

DETAILED DESCRIPTION

Figures 1, 2:
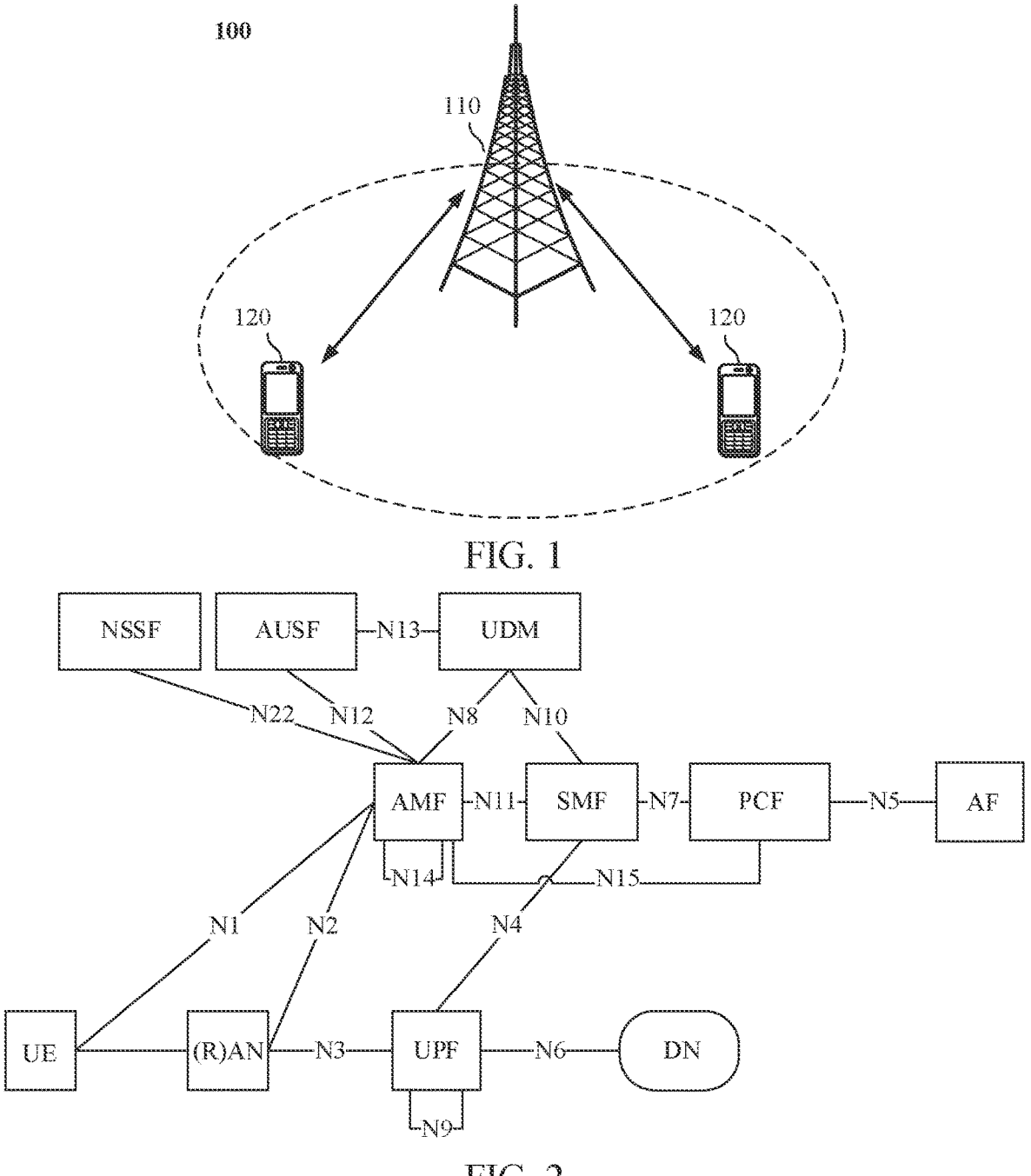
FIG. 1 is a schematic diagram of a communication system architecture according to an embodiment of this disclosure.
FIG. 2 is a system architecture diagram of a 5G network according to an embodiment of this disclosure.

Exemplary implementations now are described more comprehensively with reference to the accompanying drawings. However, the exemplary implementations may be implemented in multiple forms, and it is not understood as being limited to the examples described herein. Conversely, the implementations are provided to make this disclosure more comprehensive and complete, and the idea of the exemplary implementations is comprehensively conveyed to a person skilled in the art.

The embodiments of this disclosure provide a data transmission method, a first core network element, a second core network element, a third network element, a terminal, a communication device, a computer-readable storage medium, and a computer program product, being capable of supporting a satellite access technology while generating a UE route selection policy (URSP) rule, and generating the URSP rule that satisfies the satellite access requirements of the terminal.

An embodiment of this disclosure provides a data transmission method. The method is performed by a first core network element, and includes: generating a UE route selection policy (URSP), the URSP including a URSP rule, the URSP rule including a route selection descriptor (RSD), the RSD including satellite access indication information, and the satellite access indication information being used for indicating that a terminal selects a satellite access mode to access a core network; and delivering the URSP to the terminal through a second core network element.

An embodiment of this disclosure provides a data transmission method. The method is performed by a second core network element and includes: receiving a UE route selection policy (URSP) transmitted by a first core network element, the URSP including a URSP rule, the URSP rule including a route selection descriptor (RSD), the RSD including satellite access indication information, and the satellite access indication information being used for indicating that a terminal selects a satellite access mode to access a core network; and delivering the URSP to the terminal, the URSP rule being used for indicating that the terminal accesses the core network through the satellite access mode.

An embodiment of this disclosure provides a data transmission method. The method is performed by a third network element and includes: transmitting satellite access configuration information to a first core network element, the satellite access configuration information being used for generating a URSP, the URSP including a URSP rule, the URSP rule including an RSD, the RSD including satellite access indication information that is generated based on the satellite access configuration information, and the satellite access indication information being used for indicating that the terminal selects a satellite access mode to access a core network.

An embodiment of this disclosure provides a data transmission method. The method is performed by a terminal and includes: receiving a URSP from a second core network element, the URSP including a URSP rule, the URSP rule including an RSD, and the RSD including satellite access indication information; and accessing, according to the satellite access indication information in the RSD, a core network through a satellite access mode.

An embodiment of this disclosure provides a first core network element, including: a generation unit, configured to generate a URSP, the URSP including a URSP rule, the URSP rule including an RSD, the RSD including satellite access indication information, and the satellite access indication information being used for indicating that a terminal selects a satellite access mode to access a core network; and a transmitting unit, configured to deliver the URSP to the terminal through a second core network element.

An embodiment of this disclosure provides a second core network element, including: a receiving unit, configured to receive a URSP transmitted by a first core network element, the URSP including a URSP rule, the URSP rule including an RSD, the RSD including satellite access indication information, and the satellite access indication information being used for indicating that a terminal selects a satellite access mode to access a core network; and a transmitting unit, configured to deliver the URSP to the terminal, the URSP rule being used for indicating that the terminal accesses the core network through the satellite access mode.

An embodiment of this disclosure provides a third network element, including: a transmitting unit, configured to transmit satellite access configuration information to a first core network element, the satellite access configuration information being used for generating a URSP, the URSP including a URSP rule, the URSP rule including an RSD, the RSD including satellite access indication information, and the satellite access indication information being used for indicating that the terminal selects a satellite access mode to access a core network.

An embodiment of this disclosure provides a terminal, including: a receiving unit, configured to receive a URSP from a second core network element, the URSP including a URSP rule, the URSP rule including an RSD, and the RSD including satellite access indication information; and an access unit, configured to access, according to the satellite access indication information in the RSD, a core network through a satellite access mode.

An embodiment of this disclosure provides a computer-readable storage medium, having a computer program stored thereon, the program, when executed by a processor, implementing the data transmission method according to the foregoing embodiments.

An embodiment of this disclosure provides a communication device, including: one or more processors; and a memory, configured to store one or more programs, the one or more programs, when executed by the one or more processors, causing the communication device to implement the data transmission method according to the foregoing embodiments.

For the application requirements of the terminal for a satellite access technology, by expanding the parameter of the satellite access indication information, the embodiments of this disclosure enable the network to be capable of supporting the satellite access technology when generating the URSP rule, so that a UE can access the core network through the satellite access technology.

The technical solutions of the embodiments of this disclosure may be applied to various communication systems, such as: a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, LTE time division duplex (TDD), a universal mobile telecommunications system (UMTS), a worldwide interoperability for microwave access (WiMAX) communication system, or a 5G system.

Exemplarily, a communication system 100 applied in an embodiment of this disclosure is shown in FIG. 1. The communication system 100 may include a network device 110, and the network device 110 may be a device communicating with terminals 120 (also known as a communication terminal, a terminal). The network device 110 may provide communication coverage for a particular geographic area and may communicate with the terminal located within the coverage area. In some embodiments, the network device 110 may be a base transceiver station (BTS) in a GSM or CDMA system, a node B (NB) in a WCDMA system, may also be an evolutional node B (eNB or eNodeB) in an LTE system, a base station in a 5G communication system, or a wireless controller in a cloud radio access network (CRAN), or the network device may be a mobile switching center, a relay station, an access point, a vehicle-mounted device, a wearable device, a hub, a switch, a network bridge, a router, a network side device in a 5G network, or a network device in a future evolved public land mobile network (PLMN), etc.

The communication system 100 also includes at least one terminal 120 located within the coverage range of the network device 110. The "terminal" used herein includes, but is not limited to, connecting via wired lines, such as connecting via a public switched telephone network (PSTN), a digital subscriber line (DSL), a digital cable, and a direct cable, and/or another data connection/network, and/or via a wireless interface, such as a cellular network, a wireless local area network (WLAN), a digital television network such as a DVB-H network, a satellite network, and an AM-FM broadcast transmitter, and/or an apparatus of which another end is configured to receive/transmit a communication signal, and/or an Internet of things (IoT) device. The terminal configured to perform communication through a wireless interface may be referred to as a "wireless communication terminal", a "wireless terminal", or a "mobile terminal". Examples of the mobile terminal include, but are not limited to, a satellite or a cellular phone, a personal communication system (PCS) terminal that may combine a cellular radiotelephone with data processing, fax, and data communication capabilities, PDAs that may include a radiophone, a pager, Internet/intranet access, a web browser, a notebook, a calendar, and/or a global positioning system (GPS) receiver, and a conventional laptop and/or a handheld receiver or other electronic apparatuses including a radiotelephone transceiver. The terminal may refer to an access terminal, a user equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or other processing devices connected to a wireless modem, a vehicle-mounted device, a wearable device, a terminal in a 5G network or a terminal in a future evolved PLMN, etc.

In some embodiments, device to device (D2D) communication may be carried out between the terminals 120.

In some embodiments, a 5G system or the 5G network may also be referred to as a new radio (NR) system or an NR network.

FIG. 1 exemplarily illustrates a network device and two terminals. In some embodiments, the communication system 100 may include multiple network devices and the coverage range of each network device may include other number of terminals. This is not limited in the embodiment of this disclosure.

In some embodiments, the communication system 100 may also include a network policy control entity, a mobile management entity, and other network entities. This is not limited in the embodiment of this disclosure.

It is to be understood that in the embodiment of this disclosure, a device having a communication function in the network/system may be referred to as a communication device. By taking the communication system 100 shown in FIG. 1 as an example, the communication device may include the network device 110 and the terminals 120 having the communication function. The network device 110 and the terminals 120 may be specific devices as mentioned above, and details are not described herein again. The communication device may also include other devices in the communication system 100, such as the network policy control entity, the mobile management entity, and other network entities. This is not limited in the embodiment of this disclosure.

It is to be understood that the terms "system" and "network" are often interchangeably used herein. The term "and/or" used herein is only an association relationship describing associated objects, and indicates that there may be three relationships, for example, A and/or B, which may indicate that: A exists separately, both A and B exist, and B exists separately.

FIG. 2 is a system architecture diagram of a 5G network according to an embodiment of this disclosure. As shown in FIG. 2, the devices involved in the 5G network include: a terminal (UE)>a radio access network (RAN), a user plane function (UPF)>a data network (DN), an access and mobility Management Function (AMF), a session management function (SMF), a policy control function (PCF)>an application function (AF)>an authentication server function (AUSF), unified data management (UDM), and a network slice selection function (NSSF).

As shown in FIG. 2, the network elements related to a policy are mainly the PCF, the AMF, the SMF, the RAN, and the UE. The SMF is mainly used for executing a policy related to a session, the AMF is mainly used for executing policies related to access and UE policies, and the policy delivery and update of the two network elements (the AMF and the SMF) are controlled by the PCF.

Specifically, for the UE policy, the PCF and the UE may monitor information related to the UE policy through a container, including the content of the UE policy and a UE policy identity. In an uplink direction, the container is transmitted by the UE to the AMF through a non access stratum (NAS) message, and is continuously transmitted by the AMF (without perception or modification) to the PCF. On the contrary, in a downlink direction, the container is transmitted by the PCF to the AMF, and then transmitted to the UE by the AMF through the NAS message.

The UE policy includes a URSP. The URSP includes multiple policy rules (called as URSP rules), and each URSP rule is composed of a traffic descriptor and a set of RSDs. The traffic descriptor in the URSP is used for describing a specific service. One traffic descriptor may include one or more RSDs, and each RSD corresponds to the attribute of a PDU session, that is, service data corresponding to the traffic descriptor may be transmitted in the PDU session corresponding to the RSD.

The relevant content of the URSP in a related technology is shown in Table 1 and Table 2 below:

TABLE 1

| URSP Rule | | | | |
| --- | --- | --- | --- | --- |
| (Information Name) | Description | Category | PCF permitted to modify in a UE context | Scope |
| Rule Precedence | Determines the order the URSP rule is enforced in the UE. | Mandatory | Yes | UE context |

TABLE 1-continued

| (Information Name) | Description | Category | PCF permitted to modify in a UE context | Scope |
|---|---|---|---|---|
| Traffic descriptor | This part defines the traffic descriptor components for the URSP rule. | Optional | | |
| Application Descriptor | It is composed of OSId and OSAppId(s). (Note 2) | Optional | Yes | UE context |
| IP descriptor | Destination IP 3 tuple(s) (IP address or IPv6 network prefix, port number, protocol ID of the protocol above IP). | Optional | Yes | UE context |
| Domain descriptor | FQDN(s) or a regular expression which are used as a domain name matching criterion. | Optional | Yes | UE context |
| Non-IP descriptor | Descriptor(s) for destination information of non-IP traffic. | Optional | Yes | UE context |
| Date network name (DNN) | This is matched against the DNN information provided by the application. | Optional | Yes | UE context |
| Connection Capability | This is matched against the information provided by a UE application when it requests a network connection with certain capabilities. (Note 4) | Optional | Yes | UE context |
| List of Route Selection Descriptors | A list of Route Selection Descriptors. The components of a route selection descriptor are described in table 6.6.2.1-3. | Mandatory | | |

In Table 1 above, the rule precedence determines the order in which the UE uses the URSP rule. The traffic descriptor is used for describing the feature matching criterion for the data of the application, and is composed of one or more components, which may include: an application descriptor, an IP descriptor (a destination IP), a domain descriptor (a fully qualified domain name (FAD)), a non-IP descriptor, a data network name (DNN) descriptor and a connection capability. The traffic descriptor is used for matching data from a UE application. When each component in the traffic descriptor is matched with the corresponding features of the data from the application, the URSP rule is applicable. The URSP rule is not applicable when any component in the traffic descriptor has the following case: no corresponding information from the application is available; the corresponding information from the application does not match any value in the traffic descriptor component.

TABLE 2

| Information name | Description | Category | PCF permitted to modify in URSP | Scope |
|---|---|---|---|---|
| Route Selection Descriptor Precedence | Determines the order in which the route selection descriptors are to be applied. | Mandatory | Yes | UE context |
| Route Selection Components | This part defines the route selection components. | Mandatory | | |
| SSC Mode Selection | One single value of SSC mode. | Optional | Yes | UE context |
| Network Slice Selection | Either a single value or a list of values of S-NSSAI(s). | Optional | Yes | UE context |
| DNN selection | Either a single value or a list of values of DNN(s). | Optional | Yes | UE context |
| PDU Session Type Selection | One single value of PDU Session Type. | Optional | Yes | UE context |
| Non-Seamless Offload indication | Indicates if the traffic of the matching application is to be offloaded to non-3GPP access outside of a PDU Session. | Optional | Yes | UE context |
| ProSe Layer-3 UE-to-Network Relay Offload indication | Indicates if the traffic of the matching application is to be transmitted via a ProSe Layer-3 UE-to-Network Relay outside of a PDU session. | Optional | Yes | UE context |
| Access Type Preference | Indicates the preferred access type (3GPP or non-3GPP or Multi-Access) when the UE establishes a PDU session for the matching application. | Optional | Yes | UE context |
| PDU Session Pair ID | An indication shared by redundant PDU sessions as described in clause 5.33.2.1 of TS 23.501 [2]. | Optional | Yes | UE context |
| Robust Security Network | The RSN as described in clause 5.33.2.1 of TS 23.501 [2]. | Optional | Yes | UE context |
| Route Selection Validation Criteria | This part defines the route validation criteria components. | Optional | | |
| Parameter Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

In Table 2 above, the route selection descriptor precedence represents RSD precedence and determines the order in which the RSD is used, and only when the RSD having high precedence may not be used, other RSDs are used. A route selection component describes various network resources that may be used by an application. The route selection component is composed of one or more components and may include a service and session continuity (SSC) mode selection (the UE is used for associating a matched application with an SSC mode), a network slice selection (the UE is used for associating the matched application with S-NSSAI), a DNN selection (the UE is used for associating the matched application with a DNN), a protocol data unit (PDU) session type selection (the UE is used for matching the matched application with a PDU session type), a non-seamless offload indication and an access type priority (also called as an access type preference, indicating the preferred access type (3GPP or non 3GPP or multi-access) if the UE needs to establish a PDU session for the matched application).

The route selection validation criterion, also known as a route selection verification criterion, describes a corresponding validation criterion, including the time window (also known as a valid time window) and the location criterion (also known as a location condition). If the current time is not within the time window or the location of the UE does not match the location criterion, the corresponding RSD is considered to be invalid.

The SSC mode, the single network slice selection assistance information (S-NSSAI), the PDU session type, and the DNN are all parameters related to PDU session attributes.

In the technology of 5G and satellite convergence, a 5G core network may support that the UE accesses the core network through a satellite access technology. Satellite access may be defined as a particular access type.

However, in related technologies, satellite access is not considered in the URSP rule. Therefore, according to the method provided in the embodiment of this disclosure, the content of the URSP rule is further expanded based on the particular service requirements to support particular service demands. For example, how to define the URSP rule is provided for the application of the satellite access technology. Using the satellite access technology to access the core network may be applied to various scenes, such as mobile platforms including an airplane, an unmanned aerial vehicle, and a high-speed train, and a maritime application. With the wide coverage capability of satellites, the coverage range of a 5G network may be enhanced, and an emergency data access problem may be solved when a failure occurs in a large range of a ground base station and the ground base station may not be accessed.

A data transmission method provided in an embodiment in FIG. 3 may be performed by a first core network element. In an exemplary embodiment, the first core network element may be a PCF. But this is not limited in the embodiment of this disclosure.

As shown in FIG. 3, the method provided in the embodiment of this disclosure may include the following operations:

S310. Generate a URSP, where the URSP may include one or more (two or more) URSP rules, each URSP rule may include a route selection descriptor (RSD), one RSD or each RSD may include satellite access indication information, and the satellite access indication information is the relevant information used for indicating that the terminal selects a satellite access mode to access a core network.

The URSP may be used for enabling a UE to map a particular service flow to a corresponding data transmission session. For example, the PCF may generate multiple URSP rules in the core network, and each URSP rule may include a traffic descriptor and a route selection descriptor (RSD). When a certain application on the terminal is started, the traffic descriptor in the URSP rule generated by the core network may be matched and the corresponding URSP may be determined according to the traffic characteristic of the application program started by the terminal. Each URSP rule may include one or more RSDs, and a corresponding RSD preference may be configured for different RSDs in each URSP rule according to service requirements and types. After the corresponding URSP is matched, the terminal may select the corresponding RSD according to the RSD preference of each generated RSD, and transmit the data (referred to as service data or application data) of the application on the data transmission session corresponding to the RSD.

In an exemplary embodiment, the RSD may include a route selection component (RSC), and the route selection component may include an access type preference component. It may be known from table 2 above that the access type preference in related technologies is set to be 3GPP, non-3GPP, or Multi Access, but in the embodiment of this disclosure, the satellite access mode may be added to the access type preference component, and the satellite access indication information may include the satellite access mode added to the access type preference component. The satellite access mode may be expressed in any way, and it may indicate that the UE preferentially selects the satellite access mode to access the core network.

In an exemplary embodiment, generating a UE route selection policy (URSP) may include: receiving preferred access type indication information transmitted by a third network element, the preferred access type indication information including the satellite access mode; and determining, according to a decision, whether to accept the preferred access type indication information, and setting, in response to acceptance, the satellite access mode in the access type preference component.

In the embodiment of this disclosure, the third network element may be an AF, but this is not limited in the embodiment of this disclosure. In some embodiments, the PCF may directly generate the URSP. In some other embodiments, when the PCF generates the URSP, reference may be made to satellite access configuration information received from the AF. That is, the PCF may decide, according to a decision thereof, whether to accept the satellite access configuration information transmitted by the AF. The satellite access configuration information represents that the AF expects the UE (or a UE group) to access the core network in the satellite access mode under certain conditions, so as to satisfy the access requirements of the UE (or the UE group), thereby generating the URSP rule that satisfies the requirements of the UE (or the UE group).

In the embodiment of this disclosure, the satellite access configuration information may include at least one of the following: the preferred access type indication information, applicable geographic area information of the satellite access mode, and a wireless signal intensity parameter (such as 3GPP wireless signal intensity parameter). The value of the preferred access type indication information is the satellite access mode to inform the PCF that the AF expects that the UE (or the UE group) preferentially accesses the core network in the satellite access mode. The applicable geographic area information of the satellite access mode indicates that the satellite access mode may be used for accessing the core network when the location of the UE meets the applicable geographic area information. Conversely, the satellite access mode is not used for accessing the core network when the location of the UE does not meet the applicable geographic area information.

In an exemplary embodiment, the receiving the preferred access type indication information transmitted by the third network element may include: receiving a service parameter transmitted by the third network element, where the service parameter may include the preferred access type indication information.

In some embodiments, the AF may add the preferred access type indication information to the service parameter to transmit the service parameter to the PCF. In some other embodiments, the AF may also set new parameters to carry the preferred access type indication information in the new parameters to transmit the new parameters to the PCF.

In an exemplary embodiment, the receiving the preferred access type indication information transmitted by the third network element may include: receiving the preferred access type indication information from a fourth core network element, where the fourth core network element may be configured to receive the preferred access type indication information from the third network element.

In the embodiment of this disclosure, the fourth core network element may be an NEF, but this is not limited in the embodiment of this disclosure. In some embodiments, the AF may directly transmit the preferred access type indication information to the PCF. In some other embodiments, the AF may also transmit the preferred access type indication information to the PCF through the NEF.

In an exemplary embodiment, the RSD may include the route selection component, and the route selection component may include a satellite access indication component. The satellite access indication component includes the satellite access mode, and the satellite access indication information includes the satellite access mode in the satellite access indication component. In the foregoing embodiments, the satellite access mode may be added to the access type preference. In some other embodiments, a parameter parallel to the access type preference may also be added to the route selection component, and is called as a satellite access indication component used for indicating that the UE preferentially selects the satellite access mode to access the core network.

In an exemplary embodiment, the RSD may include a route selection validation criterion parameter, and the route selection validation criterion parameter may include a valid area parameter. The applicable geographic area information of the satellite access mode may be added to the valid area parameter, and the satellite access indication information includes the applicable geographic area information of the satellite access mode in the valid area parameter.

In an exemplary embodiment, generating the URSP may include: receiving the applicable geographic area information of the satellite access mode transmitted by the third network element; and determining, according to the decision, whether to accept the applicable geographic area information of the satellite access mode, and setting, in response to acceptance, the applicable geographic area information of the satellite access mode in the valid area parameter.

In an exemplary embodiment, the receiving the applicable geographic area information of the satellite access mode transmitted by the third network element may include: receiving the service parameter transmitted by the third network element, where the service parameter includes the applicable geographic area information of the satellite access mode.

In some embodiments, the AF may add the applicable geographic area information of the satellite access mode to the service parameter to transmit the service parameter to the PCF. In some other embodiments, the AF may also set new parameters to carry the applicable geographic area information of the satellite access mode in the new parameters to transmit the new parameters to the PCF.

In an exemplary embodiment, the receiving the preferred access type indication information transmitted by the third network element may include: receiving the applicable geographic area information of the satellite access mode from the fourth core network element, where the fourth core network element may be configured to receive the applicable geographic area information of the satellite access mode from the third network element.

In some embodiments, the AF may directly transmit the applicable geographic area information of the satellite access mode to the PCF. In some other embodiments, the AF may also transmit the applicable geographic area information of the satellite access mode to the PCF through the NEF.

In an exemplary embodiment, the RSD may include route selection validation criterion parameters (RSVC), and the route selection validation criterion parameters may include a valid area parameter and a satellite access applicable area parameter. The satellite access applicable area parameter may include the applicable geographic area information of the satellite access mode, and the satellite access indication information may include the applicable geographic area information of the satellite access mode in the satellite access applicable area parameter. In some embodiments, the applicable geographic area information of the satellite access mode may be added to the satellite access applicable area parameter. In some other embodiments, a new parameter parallel to a location criterion and a time window may be defined in the route selection validation criterion parameter, and the new parameter is called as the satellite access applicable area parameter and may be represented in any form, and may be used for indicating the applicable geographic area information of the satellite access mode.

In an exemplary embodiment, the applicable geographic area information of the satellite access mode may include at least one of the following: a satellite access cell identity list, including a satellite access cell identity; a cell identity list assigned by a base station; and geographic area information that is described by using a satellite positioning technology.

In some embodiments, the applicable geographic area information of the satellite access mode may include the satellite access cell identity list, the satellite access cell identity list includes a satellite access cell identity, and the satellite access cell identity is an identity obtained by dividing the cell using the satellite access technology and encoding each cell. In some embodiments, the applicable geographic area information of the satellite access mode may include the cell identity list assigned by the base station. That is, when the satellite access mode is used, the new parameter may not be introduced into the route selection validation criterion parameter, but the cell identity list assigned by the base station may be directly used for representing the applicable geographic area of the satellite access mode. In some embodiments, the applicable geographic area information of the satellite access mode may include the geographic area information that is described using the satellite positioning technology, such as latitude and longitude information. That is, when the UE is within the latitude and longitude limited by the location criterion, the satellite access mode may be used. In some embodiments, the applicable geographic area information of the satellite access mode may include the satellite access cell identity list and the cell identity list assigned by the base station. In some embodiments, the applicable geographic area information of the satellite access mode may include the cell identity list assigned by the base station and the geographic area information that is described using the satellite positioning technology. In some embodiments, the applicable geographic area information of the satellite access mode may include the satellite access cell identity list, the cell identity list assigned by the base station, and the geographic area information that is described using the satellite positioning technology.

In an exemplary embodiment, the applicable geographic area information of the satellite access mode is used for indicating at least one of the following:

When the terminal is in the applicable geographic area corresponding to the applicable geographic area information, it is indicated that the terminal uses the satellite access mode to access the core network (that is, it may be specified that in a particular geographic area, the satellite access mode is used for accessing the core network, and the particular geographic area may be represented in the applicable geographic area information of the satellite access mode, such as remote areas where 4G and 5G network signals may not cover, or interruption situations such as power outage in 4G and 5G networks).

It is indicated that the terminal uses the satellite access mode to access the core network when the valid area parameter does not include the cell identity list and the terminal is in the applicable geographic area. The cell identity list here may refer to the cell identity list assigned by the base station, such as an evolved-universal mobile telecommunication system (UMTS) terrestrial radio access (E-UTRA) cell identity list, an NR cell identity list, a global RAN node identity list, and a tracking area identity (TAI) list.

It is indicated that the terminal uses the satellite access mode to access the core network when the RSD includes the cell identity list, the access type preference component of the RSD is the satellite access mode, and the terminal is in the applicable geographic area.

In an exemplary embodiment, the RSD may include the route selection validation criterion parameter, the route accept the wireless signal intensity parameter, and setting, in response to acceptance, the wireless signal intensity parameter in the route selection validation criterion parameter.

In an exemplary embodiment, the receiving the wireless signal intensity parameter transmitted by the third network element may include: receiving the service parameter transmitted by the third network element, the service parameter including the wireless signal intensity parameter.

In an exemplary embodiment, the receiving the wireless signal intensity parameter transmitted by the third network element may include: receiving the wireless signal intensity parameter from the fourth core network element, where the fourth core network element may be configured to receive the wireless signal intensity parameter from the third network element.

The method provided in the embodiment of this disclosure is exemplified below. According to the method provided by the embodiment of this disclosure, for the satellite access technology, it is proposed that satellite access as a possible access type is added to the URSP rule, and a corresponding parameter, for example, the added parameter in the service parameter provided by the AF to the NEF, i.e., the satellite access configuration information, is supplemented in the AF and the process of affecting the URSP rule by the AF that interacts with a network.

In the relevant URSP rule, the route selection component is defined in the RSD, where one component is the access type preference. In some embodiments, the satellite access mode may be added to the access type preference. In some other embodiments, a parameter parallel to the access type preference may also be added to the route selection component to indicate that the access type of satellite access is added.

In some embodiments, the description mode of a location supported by the satellite access mode may be supplemented in the location criterion of the route selection validation criterion parameter, and is called as the applicable geographic area information of the satellite access mode.

In some embodiments, the exemplary specific content of the location criterion is as follows:

Length of location criteria (octect d);

The coding rules for different areas included in the location criterion are as follows:

| 8 | 7 | 6 | 5 | 4 | 3 | 2 | 1 | |
|---|---|---|---|---|---|---|---|---|
| 0 | 0 | 0 | 0 | 0 | 0 | 0 | 1 | E-UTRA cell identity list |
| 0 | 0 | 0 | 0 | 0 | 0 | 1 | 0 | NR cell identity list 0 0  0  0  0  0  1 |
| 1 | Global RAN node identity list | | | | | | | |
| 0 | 0 | 0 | 0 | 0 | 1 | 0 | 0 | TAI list | selection validation criterion parameter may include the wireless signal intensity parameter, and the satellite access indication information includes the wireless signal intensity parameter and is used for indicating that:

the terminal selects, when the wireless signal intensity of the terminal is less than the wireless signal intensity parameter, the satellite access mode to access the core network; and the terminal does not select, when the wireless signal intensity of the terminal is greater than or equal to the wireless signal intensity parameter, the satellite access mode to access the core network.

In an exemplary embodiment, the generating a UE route selection policy may include: receiving the wireless signal intensity parameter transmitted by the third network element; and determining, according to the decision, whether to On the basis of the aforementioned codes, a code may be added as the satellite access cell identity list which includes the satellite access cell identity. That is, a cell or location information designed for the satellite access technology, for example, may be called as a satellite cell and the like. A satellite cell identity (Satellite Cell ID) may be obtained by coding the ID of the satellite cell.

In some other embodiments, in the satellite access mode, the location criterion may not include the foregoing E-UTRA cell identity list, the NR cell identity list, the Global RAN node identity list, and the TAI list. Therefore, the coding rules of the foregoing location criterion may not be reused, but the geographic area information described by using the satellite positioning technology may be added to the location criterion. The geographic area information described by using the satellite positioning technology is the geographic position information that is determined by using the satellite positioning technology, and may be longitude and latitude information, such as longitude and latitude information based on the global positioning system (GPS), but this is not limited to in the embodiment of this disclosure. Alternatively, when there is no NR cell and/or E-UTRA cell available for UE access, the satellite access technology is selected as the access type.

The list in the URSP rule may be combined in multiple ways. For example, when the UE accesses a certain cell, the UE assigns a cell identity (Cell ID), and if the cell identity is not matched with the cell identities in the cell identity list of the URSP rule, it is considered that the UE has no accessible cell. In this case, the satellite access mode may be selected to access the core network. Alternatively, when there is no NR cell and/or E-UTRA cell list in the type of location area of the URSP rule, the satellite access mode is selected by default to access the core network. Alternatively, when there are both NR cell and/or E-UTRA cell lists and the satellite cell identity list in the URSP rule, but it is specified that the satellite access mode is preferentially selected in the access type preference, the satellite access mode is selected to access the core network.

The following specific parameter parallel to the location criterion and the time window may also be added to the route selection validation criterion parameter proposed in the embodiment of this disclosure: 3GPP wireless signal intensity. When the 3GPP wireless signal intensity is lower than a certain value, the satellite access mode is selected, and when the 3GPP wireless signal intensity is higher than a certain value, the satellite access mode is not selected.

The embodiments may be parallel schemes, and may also be combined in various possible forms.

In related technologies, the process of affecting the URSP rule by the AF is defined. The parameter information that may be provided by the UE to the network element such as the NEF in the network includes:

1) a service description indicates an AF identifier;
2) a service parameter;
3) a specific UE, or a group of UE(s) or any UE that the AF request may be associated with; and
4) a subscription to events.

The embodiment of this disclosure proposes that preferred access type indication information (a specific value may be the satellite access mode) may be added to the foregoing service parameter, that is, when the AF may request the network to select a particular route (satellite access) for a particular service flow, it is indicated that the PCF processes the request of the AF when generating the URSP rule, and the satellite access technology is added to the access type preference of the route selection component.

Particular service flows may be, for example, some special Internet services, such as emergency information access services; and in particular areas such as deserts, remote rural areas, mountainous areas and the like where 5G and 4G networks may not cover, or although 5G and 4G networks may cover, the satellite access mode may also be specified in particular situations such as base station destruction or power outage.

The embodiment of this disclosure proposes that the applicable geographic area information, such as GPS information, of the satellite access mode may be added to the service parameter. That is, when the AF may request the network to select a particular route for the UE in a particular geographic area, it is indicated that the PCF processes the request of the AF when generating the URSP rule, and the particular geographic area information is set as a particular route selection validation criterion parameter. That is, only the UE located in the particular geographic area information may use satellite access.

The embodiment of this disclosure proposes that the access criterion of the satellite access mode, such as wireless signal intensity, may be added to the service parameter. That is, when the AF may request the network that when the wireless signal intensity of the UE is lower than a particular value, the UE selects the satellite access mode, i.e., it is indicated that the PCF processes the request of the AF when generating the URSP rule, and a wireless signal intensity parameter value is added to the route selection validation criterion parameter.

S320. Deliver the URSP to the terminal through a second core network element.

The second core network element may be configured to deliver the URSP to the terminal. In the embodiment of this disclosure, the second core network element may be an AMF, but this is not limited in the embodiment of this disclosure.

For example, the network device 110 in the embodiment in FIG. 1 may be a core network device of the communication system, and may generate multiple URSP rules, and each URSP rule may include a traffic descriptor and an RSD. One or more applications may be installed on the terminal 120. When a certain application on the terminal 120 is started, the terminal 120 may be matched with the traffic descriptor in the URSP rule based on the traffic characteristic of the started application, and route the data of the started application based on the RSD corresponding to the traffic descriptor.

The URSP rule may include one or more RSDs, and each RSD may be used for indicating a corresponding PDU session. For example, the RSD may include parameters of PDU session establishment, such as a DNN, a network slice selection policy, an S-NSSAI, and a PDU session type. PDU sessions corresponding to different RSDs may provide different Internet surfing experience.

According to the method provided by the embodiment of this disclosure, for the satellite access technology, the network is enabled to introduce support for the satellite access technology when generating the URSP rule, so that the UE may access the core network through the satellite access technology.

According to the method provided by the embodiment of this disclosure, the network is enabled to support the satellite access technology through an interaction between the application and the network when generating the URSP rule, and generate the URSP rule that meets the application requirements.

The embodiment in FIG. 4 is illustrated by taking a first core network element as a PCF, a second core network element as an AMF, a third network element as an AF, and the direct interaction between the AF and the PCF as an example.

FIG. 4 schematically illustrates a schematic interaction diagram of a data transmission method according to an embodiment of this disclosure. As shown in FIG. 4, the method provided in the embodiment of this disclosure may include the following operations:

S41. The AF transmits satellite access configuration information to the PCF.

S42. The PCF is configured with a URSP.

After the satellite access configuration information is received from the AF, it is determined, according to a decision, whether to accept the satellite access configuration information, and in response to accepting the satellite access configuration information, reference is made to the satellite access configuration information when generating the URSP, so that satellite access indication information is included in an RSD of a generated URSP rule. In response to not accepting the satellite access configuration information, reference is not made to the satellite access configuration information when generating the URSP, i.e., the satellite access indication information is not included in the RSD of the generated URSP rule.

It may be understood that the satellite access configuration information may be included in an existing parameter in an existing message, and may also be included in an added parameter in the existing message, or may be transmitted through the added message. This is not limited in the embodiment of this embodiment.

S41 may be defaulted. When S41 is defaulted, the URSP may be directly generated by the PCF.

S43. The PCF transmits the generated URSP to the AMF.

The PCF may place the generated URSP in a container and transmit same to the AMF, but this is not limited in the embodiment of this disclosure.

S44. The AMF transmits the URSP to a UE through an RAN after receiving the URSP.

In the embodiment of this disclosure, the AMF may use an NAS message to directly forward the container to the UE, but this is not limited in the embodiment of this disclosure.

The UE associates application data with a corresponding PDU session for transmission based on the received URSP, and a mechanism is as follows: when an application layer transmits data, the UE uses a URSP rule in the URSP to check whether the characteristics of the application data is matched with the traffic descriptor of a certain rule in the URSP rule, and a check order is determined according to preference in the URSP rule, that is, the UE sequentially checks match situations based on the order of preference, and when the traffic descriptor of one URSP rule is matched, PDU session binding is performed by using an RSD list under the URSP rule. When the URSP rule is matched, the UE searches for a suitable PDU session according to the order of preference in the RSD. The RSD having high preference is used preferentially. If a certain parameter in the RSD is one or more values, the UE selects a combination of parameters to detect whether there is the PDU session:

1) if there is the PDU session, the application data is bound to the session for transmission;

2) if there is no PDU session, the UE triggers the creation of the PDU session to create the attribute parameters of the PDU session reported by the UE in a request message; further, 2.1) if the session is created successfully, the UE binds the application data to the session for transmission; and 2.2) if the session is not created successfully, the UE detects, based on other parameter combinations in the RSD or using parameter combinations in the RSD having secondary preference, whether the PDU session exists (circulating operation 1).

If the suitable PDU session may not be found for binding according to the matched URSP rule, the UE searches for the traffic descriptor having secondary preference in the URSP rule according to the preference order of the traffic descriptor in the rule preference to check whether the traffic descriptor is matched with the characteristics of the application data, and when the traffic descriptor is matched, the process described above is repeated.

Reference may be made to other embodiments mentioned above for the other content of the embodiment in FIG. 4.

The embodiment in FIG. 5 is illustrated by taking a first core network element as a PCF, a second core network element as an AMF, a third network element as an AF, a fourth core network element as an NEF, and an interaction between the AF and the PCF through the NEF as an example.

FIG. 5 schematically illustrates a schematic interaction diagram of a data transmission method according to another embodiment of this disclosure. As shown in FIG. 5, the method provided in the embodiment of this disclosure may include the following operations:

S51. The AF transmits satellite access configuration information to the NEF.

S52. After receiving the satellite access configuration information from the AF, the NEF forwards the satellite access configuration information to the PCF.

S53. After receiving the satellite access configuration information from the NEF, the PCF determines, according to a decision, whether to accept the satellite access configuration information, and in response to accepting the satellite access configuration information, refers to the satellite access configuration information when generating a URSP, so that satellite access indication information is included in an RSD of a generated URSP rule. In response to not accepting the satellite access configuration information, reference is not made to the satellite access configuration information when generating the URSP, i.e., the satellite access indication information is not included in the RSD of the generated URSP rule.

S51 and S52 may be defaulted. When S51 and S52 are defaulted, the URSP may be directly generated by the PCF.

S54. The PCF transmits the generated URSP to the AMF.

S55. The AMF transmits the URSP to a UE through an RAN after receiving the URSP.

Reference may be made to other embodiments mentioned above for the other content of the embodiment in FIG. 5.

A data transmission method provided in the embodiment in FIG. 6 may be performed by a second core network element. In an exemplary embodiment, the second core network element may be an AMF.

As shown in FIG. 6, the method provided in the embodiment of this disclosure may include the following operations:

S610. Receive a URSP transmitted by a first core network element, the URSP including a URSP rule, the URSP rule including an RSD, the RSD including satellite access indication information, and the satellite access indication information being used for indicating that a terminal selects a satellite access mode to access a core network.

S620. Deliver the URSP to the terminal.

The URSP rule may be used for indicating that the terminal accesses the core network through the satellite access mode.

Reference may be made to other embodiments mentioned above for the other content of the embodiment in FIG. 6.

A data transmission method provided in the embodiment in FIG. 7 may be performed by a third network element. In an exemplary embodiment, the third network element may be an AF.

As shown in FIG. 7, the method provided in the embodiment of this disclosure may include the following operations:

S710. Transmit satellite access configuration information to a first core network element.

The satellite access configuration information may be used for generating a UE route selection policy (URSP), the URSP includes a URSP rule, the URSP rule includes a route selection descriptor (RSD), and the RSD includes satellite access indication information. The satellite access indication information may be used for indicating that the terminal selects a satellite access mode to access a core network.

In an exemplary embodiment, transmitting the satellite access configuration information to the first core network element may include: transmitting the satellite access configuration information to a fourth core network element, where the fourth core network element may be configured to transmit the satellite access configuration information to the first core network element.

Reference may be made to other embodiments mentioned above for the other content of the embodiment in FIG. 7.

A data transmission method provided in the embodiment in FIG. 8 may be performed by a terminal, but this is not limited in the embodiment of this disclosure.

As shown in FIG. 8, the method provided in the embodiment of this disclosure may include the following operations:

S810. Receive a UE route selection policy (URSP) from a second core network element, the URSP including a URSP rule, the URSP rule including a route selection descriptor (RSD), and the RSD including satellite access indication information.

S820. Access a core network through a satellite access mode according to the satellite access indication information in the RSD.

Reference may be made to other embodiments mentioned above for the other content of the embodiment in FIG. 8.

As shown in FIG. 9, a first core network element 900 provided in the embodiment in FIG. 9 may include a generation unit 910 and a transmitting unit 920.

The generation unit 910 may be configured to generate a UE route selection policy (URSP), the URSP including a URSP rule, the URSP rule including a route selection descriptor (RSD), the RSD including satellite access indication information, and the satellite access indication information being used for indicating that a terminal selects a satellite access mode to access a core network.

The transmitting unit 920 may be configured to deliver the URSP to the terminal through a second core network element.

In an exemplary embodiment, the first core network element 900 may further include a receiving unit that may be configured to receive satellite access configuration information transmitted by a third network element. The generation unit 910 makes reference to the satellite access configuration information when generating the URSP.

In an exemplary embodiment, the RSD may include a route selection component, and the route selection component may include an access type preference component. The access type preference component may include the satellite access mode, and the satellite access indication information may include the satellite access mode in the access type preference component.

In an exemplary embodiment, the first core network element 900 may further include a receiving unit that may be configured to receive preferred access type indication information transmitted by the third network element, and the preferred access type indication information includes the satellite access mode. The generation unit 910 may be further configured to determine, according to a decision, whether to accept the preferred access type indication information, and set, in response to acceptance, the satellite access mode in the access type preference component.

In an exemplary embodiment, the receiving unit may be further configured to: receive a service parameter transmitted by the third network element, the service parameter including the preferred access type indication information.

In an exemplary embodiment, the receiving unit may be further configured to: receive the preferred access type indication information from a fourth core network element. The fourth core network element may be configured to receive the preferred access type indication information from the third network element.

In an exemplary embodiment, the RSD may include the route selection component, and the route selection component may include a satellite access indication component. The satellite access indication component may include the satellite access mode, and the satellite access indication information may include the satellite access mode in the satellite access indication component.

In an exemplary embodiment, the RSD may include a route selection validation criterion parameter, and the route selection validation criterion parameter may include a valid area parameter. The valid area parameter may include applicable geographic area information of the satellite access mode, and the satellite access indication information may include applicable geographic area information of the satellite access mode in the valid area parameter.

In an exemplary embodiment, the first core network element 900 may further include the receiving unit that may be configured to: receive the applicable geographic area information of the satellite access mode transmitted by the third network element. The generation unit 910 may be further configured to: determine, according to a decision, whether to accept the applicable geographic area information of the satellite access mode, and set, in response to acceptance, the applicable geographic area information of the satellite access mode in the valid area parameter.

In an exemplary embodiment, the receiving unit may be further configured to: receive the service parameter transmitted by the third network element, the service parameter including the applicable geographic area information of the satellite access mode.

In an exemplary embodiment, the receiving unit may be further configured to: receive the applicable geographic area information of the satellite access mode from the fourth core network element, where the fourth core network element may be configured to receive the applicable geographic area information of the satellite access mode from the third network element.

In an exemplary embodiment, the RSD may include route selection validation criterion parameters, and the route selection validation criterion parameters may include the valid area parameter and a satellite access applicable area parameter. The satellite access applicable area parameter may include the applicable geographic area information of the satellite access mode, and the satellite access indication information may include the applicable geographic area information of the satellite access mode in the satellite access applicable area parameter.

In an exemplary embodiment, the applicable geographic area information of the satellite access mode may include at least one of the following: a satellite access cell identity list, including a satellite access cell identity; a cell identity list assigned by a base station; and geographic area information that is described by using a satellite positioning technology.

In an exemplary embodiment, the applicable geographic area information of the satellite access mode is used for indicating at least one of the following: indicating, when the terminal is in an applicable geographic area corresponding to the applicable geographic area information, that the terminal uses the satellite access mode to access the core network; indicating, when the valid area parameter does not include the cell identity list and the terminal is in the applicable geographic area, that the terminal uses the satellite access mode to access the core network; and indicating, when the RSD includes the cell identity list, an access type preference component of the RSD is the satellite access mode, and the terminal is in the applicable geographic area, that the terminal uses the satellite access mode to access the core network.

In an exemplary embodiment, the RSD may include the route selection validation criterion parameter, the route selection validation criterion parameter may include a wireless signal intensity parameter, and the satellite access indication information includes the wireless signal intensity parameter and is used for indicating that: the terminal selects, when the wireless signal intensity of the terminal is less than the wireless signal intensity parameter, the satellite access mode to access the core network; and the terminal does not select, when the wireless signal intensity of the terminal is greater than or equal to the wireless signal intensity parameter, the satellite access mode to access the core network.

In an exemplary embodiment, the first core network element 900 may further include the receiving unit that may be configured to: receive the wireless signal intensity parameter transmitted by the third network element. The generation unit 910 may be further configured to: determining, according to the decision, whether to accept the wireless signal intensity parameter, and setting, in response to acceptance, the wireless signal intensity parameter in the route selection validation criterion parameter.

In an exemplary embodiment, the receiving unit may be further configured to: receive the service parameter transmitted by the third network element, the service parameter including the wireless signal intensity parameter.

In an exemplary embodiment, the receiving unit may be further configured to: receive the wireless signal intensity parameter from the fourth core network element, where the fourth core network element may be configured to receive the wireless signal intensity parameter from the third network element.

Reference may be made to other embodiments mentioned above for the other content of the embodiment in FIG. 9.

Figures 10, 11:
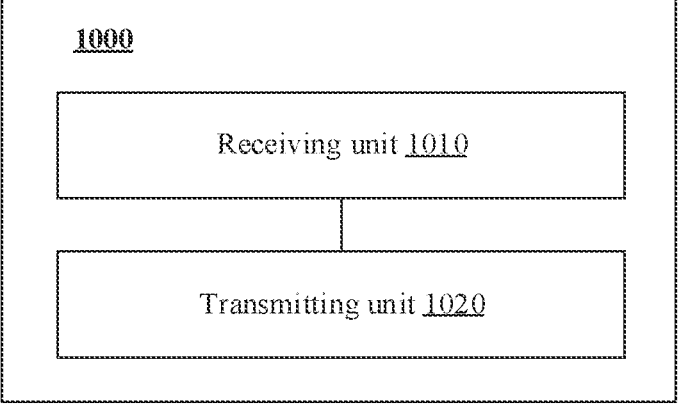
FIG. 10 schematically illustrates a block diagram of a second core network element according to an embodiment of this disclosure.
FIG. 11 schematically illustrates a block diagram of a third network element according to an embodiment of this disclosure.

As shown in FIG. 10, a second core network element 1000 provided in the embodiment in FIG. 10 may include a receiving unit 1010 and a transmitting unit 1020.

The receiving unit 1010 may be configured to receive a UE route selection policy (URSP) transmitted by a first core network element, the URSP including a URSP rule, the URSP rule including a route selection descriptor (RSD), the RSD including satellite access indication information, and the satellite access indication information being used for indicating that a terminal selects a satellite access mode to access a core network.

The transmitting unit 1020 may be configured to deliver the URSP to the terminal.

The URSP rule may be configured to indicate that the terminal accesses the core network through the satellite access mode.

Reference may be made to other embodiments mentioned above for the other content of the embodiment in FIG. 10.

As shown in FIG. 11, a third network element 1100 provided in the embodiment in FIG. 11 may include a transmitting unit 1110.

The transmitting unit 1110 may be configured to transmit satellite access configuration information to a first core network element.

The satellite access configuration information may be configured to generate a UE route selection policy (URSP), the URSP may include a URSP rule, the URSP rule may include a route selection descriptor (RSD), and the RSD may include satellite access indication information.

The satellite access indication information may be used for indicating that the terminal selects a satellite access mode to access a core network.

In an exemplary embodiment, the transmitting unit 1110 may be further configured to: transmit the satellite access configuration information to a fourth core network element. The fourth core network element may be configured to transmit the satellite access configuration information to the first core network element.

Reference may be made to other embodiments mentioned above for the other content of the embodiment in FIG. 11.

Figure 12:
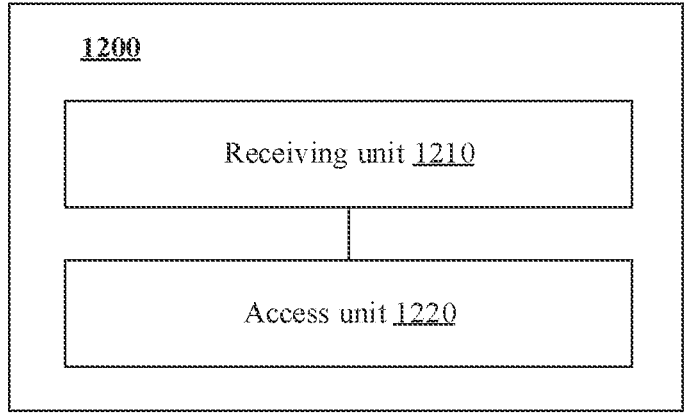
FIG. 12 schematically illustrates a block diagram of a terminal according to an embodiment of this disclosure.

As shown in FIG. 12, a terminal 1200 provided in the embodiment in FIG. 12 may include a receiving unit 1210 and an access unit 1220.

The receiving unit 1210 may be configured to receive a UE route selection policy (URSP) from a second core network element, the URSP including a URSP rule, the URSP rule including a route selection descriptor (RSD), and the RSD including satellite access indication information.

The access unit 1220 may be configured to access, according to the satellite access indication information in the RSD, a core network through a satellite access mode.

Reference may be made to other embodiments mentioned above for the other content of the embodiment in FIG. 12.

Figure 13:
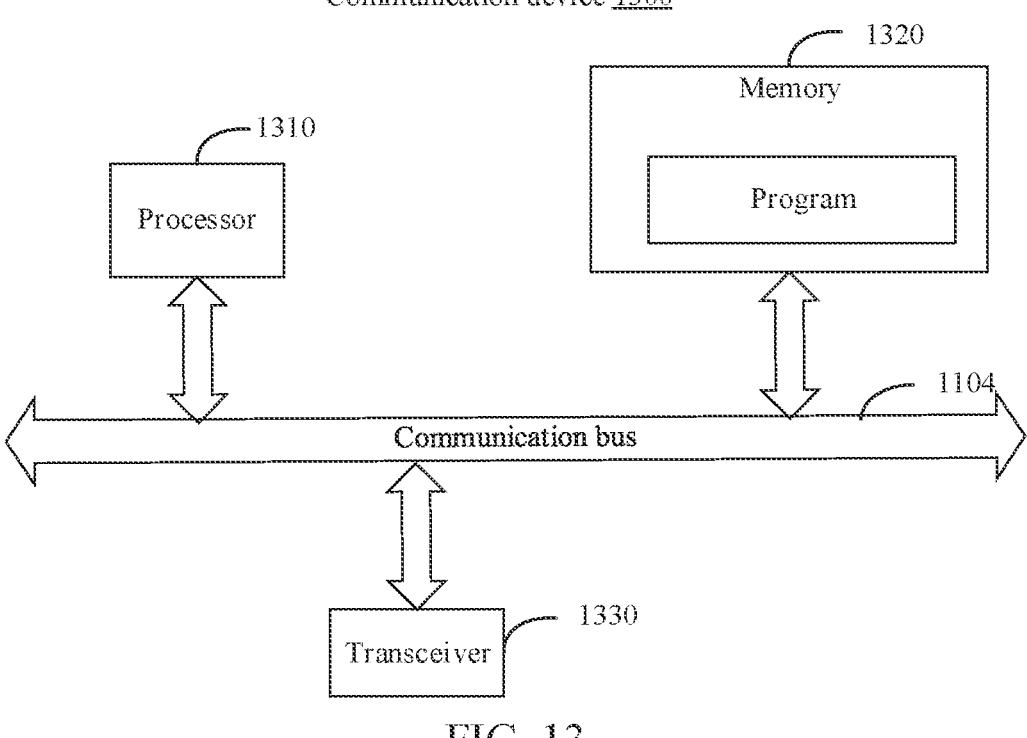
FIG. 13 schematically illustrates a schematic diagram of a structure of a communication device according to an embodiment of this disclosure.

FIG. 13 schematically illustrates a schematic diagram of a structure of a communication device 1300 according to an embodiment of this disclosure. The communication device may be a terminal, and may also be a core network device, such as a first core network element, and/or a second core network element, and/or a third network element, and/or a fourth core network element. The communication device 1300 shown in FIG. 13 includes a processor 1310, and the processor 1310 may call and run a computer program from a memory to implement the method according to the embodiments of this disclosure.

In some embodiments, as shown in FIG. 13, the communication device 1300 may further include a memory 1320. The processor 1310 may call and run the computer program from the memory 1320 to implement the method according to the embodiments of this disclosure.

The memory 1320 may be a separate device independent of the processor 1310 or may be integrated in the processor 1310.

In some embodiments, as shown in FIG. 13, the communication device 1300 may further include a transceiver 1330, and the processor 1310 may control the transceiver 1330 to communicate with other devices. Specifically, the transceiver may transmit information or data to other devices or receive information or data transmitted from other devices.

The transceiver 1330 may include a transmitter and a receiver. The transceiver 1330 may further include antennas, and there may be one or more antennas.

In some embodiments, the communication device 1300 may be specifically a core network device in the embodiment of this disclosure, and the communication device 1300 may implement the corresponding processes implemented by the core network device in various methods of the embodiments of this disclosure. For the purpose of concision, details are not described herein again.

In some embodiments, the communication device 1300 may be specifically a mobile terminal/terminal in the embodiment of this disclosure, and the communication device 1300 may implement the corresponding processes implemented by the mobile terminal/terminal in various methods of the embodiments of this disclosure. For the purpose of concision, details are not described herein again.

It is to be understood that the processor of the embodiment of this disclosure may be an integrated circuit chip and has a signal processing capability. During implementation, the operations in the foregoing method embodiments may be completed by using a hardware-integrated logic circuit or instructions in a form of software in the processor.

The foregoing processor may be a general-purpose processor, a digital signal processor (DSP), an application specific integrated circuit (ASIC), a field programmable gate array (FPGA) or another programmable logic device, a discrete gate or a transistor logic device, and discrete hardware component. The methods, the operations, and the logic block diagrams disclosed in the embodiments of this disclosure may be implemented or performed. The general-purpose processor may be a microprocessor, or the processor may be any conventional processor or the like. The operations of the methods disclosed in the embodiments of this disclosure may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register, etc. The storage medium is located in the memory. The processor reads information in the memory and completes the operations of the foregoing methods in combination with hardware thereof.

It can be understood that the memory in the embodiment of this disclosure may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) used as an external cache. By way of example but not limited description, RAMs are available in many forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). The memory of the systems and methods described herein includes, but is not limited to, these and any other suitable types of memory. It is to be understood that the foregoing memory is exemplary but not restrictive.

An embodiment of this disclosure further provides a computer-readable storage medium configured to store a computer program.

In some embodiments, the computer-readable storage medium may be applied to a core network device of the embodiment of this disclosure, and the computer program causes a computer to implement the corresponding processes implemented by the core network device in various methods of the embodiments of this disclosure. For the purpose of concision, details are not described herein again.

In some embodiments, the computer-readable storage medium may be applied to a mobile terminal/terminal of the embodiment of this disclosure, and the computer program causes the computer to implement the corresponding processes implemented by the mobile terminal/terminal in various methods of the embodiments of this disclosure. For the purpose of concision, details are not described herein again.

An embodiment of this disclosure further provides a computer program product, including a computer program instruction.

In some embodiments, the computer program product may be applied to a core network device of the embodiment of this disclosure, and the computer program instruction causes a computer to implement the corresponding processes implemented by the core network device in various methods of the embodiments of this disclosure. For the purpose of concision, details are not described herein again.

In some embodiments, the computer program product may be applied to a mobile terminal/terminal of the embodiment of this disclosure, and the computer program instruction causes the computer to implement the corresponding processes implemented by the mobile terminal/terminal in various methods of the embodiments of this disclosure. For the purpose of concision, details are not described herein again.

An embodiment of this disclosure further provides a computer program.

In some embodiments, the computer program may be applied to a core network device of the embodiment of this disclosure, and the computer program, when being run on a computer, causes the computer to implement the corresponding processes implemented by the core network device in various methods of the embodiments of this disclosure. For the purpose of concision, details are not described herein again.

In some embodiments, the computer program may be applied to a mobile terminal/terminal of the embodiment of this disclosure, and the computer program, when being run on the computer, causes the computer to implement the corresponding processes implemented by the mobile terminal/terminal in various methods of the embodiments of this disclosure. For the purpose of concision, details are not described herein again.

A person of ordinary skill in the art may be aware that the exemplary units and algorithm operations described with reference to the embodiments disclosed herein may be implemented by electronic hardware, or a combination of computer software and electronic hardware. Whether these functions are implemented in hardware or software depends on the particular applications and design constraints of the technical solutions. A person skilled in the art may use different methods to implement the described functions for each particular application, but such implementation may not be considered beyond the scope of this disclosure.

A person skilled in the art may clearly understand that for convenient and brief description, reference may be made to corresponding processes in the foregoing method embodiments for the specific working processes of the foregoing described systems, apparatuses, and units. Details are not described herein.

In the several embodiments provided in this disclosure, it is to be understood that the disclosed systems, apparatuses, and methods may be implemented in other modes. For example, the described apparatus embodiments are merely exemplary. For example, the division of the units is merely the division of logical functions, and other division modes may be used during actual implementation. For example, a plurality of units or components may be combined or integrated into another system, or some features may be ignored or not performed.

The units described as separate components may or may not be physically separated, and the components displayed as units may or may not be physical units, and may be located in one place, or may be distributed over a plurality of network units. Some or all of the units may be selected based on actual needs to achieve the objectives of the solutions of the embodiments.

In addition, the functional units in the embodiments of this disclosure may be integrated into one processing unit, or each of the units may be physically separated, or two or more units may be integrated into one unit.

If implemented in the form of software functional units and sold or used as an independent product, the functions may be stored in a computer-readable storage medium. Based on such an understanding, the technical solutions of this disclosure essentially, or a part thereof contributing to the related art, or a part of the technical solutions may be implemented in a form of a software product. The computer software product is stored in a storage medium and includes several instructions for instructing a computer device (which may be a personal computer, a server, a network device, or the like) to perform all or some of the operations of the methods described in the embodiments of this disclosure. The foregoing storage medium includes various media capable of storing program codes, such as a USB flash drive, a removable hard disk, a read-only memory (ROM), a random access memory (RAM), a magnetic disk, or an optical disc, etc.

The foregoing descriptions are merely specific implementations of this disclosure, but the scope of protection of this disclosure is not limited thereto. Within the technical scope disclosed by this disclosure, a person skilled in the art can readily conceive that any variation or substitution shall fall within the scope of protection of this disclosure. Therefore, the scope of protection of this disclosure shall be defined by the scope of protection of the claims.

What is claimed is:

1. A method for data transmission in a 5G communication network, performed by a first network element, the method comprising:
  generating a UE route selection policy (URSP), the URSP comprising a URSP rule, the URSP rule comprising a route selection descriptor (RSD), the RSD comprising satellite access indication information, and the satellite access indication information indicating a satellite access mode to access a core network, wherein the generating the URSP comprises:
    receiving preferred access type indication information transmitted by a second network element, the preferred access type indication information comprising the satellite access mode;
    determining whether to accept the preferred access type indication information; and
    based on determining to accept the preferred access type indication information, setting the satellite access mode in an access type preference component; and
  transmitting the URSP to a terminal through a third network element.

2. The method according to claim 1, wherein the RSD comprises a route selection component, the route selection component comprising the access type preference component, the access type preference component comprising the satellite access mode, and the satellite access indication information comprising the satellite access mode in the access type preference component.

3. The method according to claim 1, wherein the RSD comprises a route selection validation criterion parameter, wherein the route selection validation criterion parameter comprises a valid area parameter and a satellite access applicable area parameter, and wherein the satellite access applicable area parameter comprises applicable geographic area information of the satellite access mode, and wherein the satellite access indication information comprises the applicable geographic area information of the satellite access mode in the satellite access applicable area parameter.

4. The method according to claim 1, wherein the RSD comprises a route selection component, wherein the route selection component comprises a satellite access indication component, wherein the satellite access indication component comprises the satellite access mode, and wherein the satellite access indication information comprises the satellite access mode in the satellite access indication component.

5. The method according to claim 1, wherein the RSD comprises a route selection validation criterion parameter, wherein the route selection validation criterion parameter comprises a valid area parameter, wherein the valid area parameter comprises applicable geographic area information of the satellite access mode, and wherein the satellite access indication information comprises the applicable geographic area information of the satellite access mode in the valid area parameter.

6. The method according to claim 5, wherein the generating the URSP comprises:
  receiving the applicable geographic area information of the satellite access mode transmitted by the second network element; and
  determining whether to accept the applicable geographic area information of the satellite access mode; and
  based on determining to accept the applicable geographic area information of the satellite access mode, setting the applicable geographic area information of the satellite access mode in the valid area parameter.

7. The method according to claim 5, wherein the applicable geographic area information of the satellite access mode indicates at least one of:
  based on the terminal being in an applicable geographic area corresponding to the applicable geographic area information, the applicable geographic area information of the satellite access mode indicates that the terminal uses the satellite access mode to access the core network;
  based on the valid area parameter not comprising a cell identity list and the terminal being in the applicable geographic area, the applicable geographic area information of the satellite access mode indicates that the terminal uses the satellite access mode to access the core network; and
  based on the RSD comprising the cell identity list, the access type preference component of the RSD being the satellite access mode, and the terminal being in the applicable geographic area, the applicable geographic area information of the satellite access mode indicates that the terminal uses the satellite access mode to access the core network.

8. The method according to claim 5, wherein the applicable geographic area information of the satellite access mode comprises at least one of:
  a satellite access cell identity list, comprising a satellite access cell identity;
  a cell identity list assigned by a base station; and
  geographic area information that is described by using a satellite positioning technology.

9. The method according to claim 1, wherein the RSD comprises a route selection validation criterion parameter, wherein the route selection validation criterion parameter comprises a wireless signal intensity parameter, wherein the satellite access indication information comprises the wireless signal intensity parameter, and wherein the satellite access indication information indicates:

based on a wireless signal intensity of the terminal being less than the wireless signal intensity parameter, the satellite access mode is selected to access the core network; and based on the wireless signal intensity of the terminal being greater than or equal to the wireless signal intensity parameter, the satellite access mode is not selected to access the core network.

10. The method according to claim 9, wherein the generating the URSP comprises:

receiving the wireless signal intensity parameter transmitted by the second network element;

determining whether to accept the wireless signal intensity parameter; and based on determining to accept the wireless signal intensity parameter, setting the wireless signal intensity parameter in the route selection validation criterion parameter.

11. A non-transitory computer-readable medium storing program code which, when executed by one or more processors of a first network element for data transmission in a 5G communication network, cause the one or more processors to at least:

generate a UE route selection policy (URSP), the URSP comprising a URSP rule, the URSP rule comprising a route selection descriptor (RSD), the RSD comprising satellite access indication information, and the satellite access indication information indicating a satellite access mode to access a core network, wherein the generating comprises:

receiving preferred access type indication information transmitted by a second network element, the preferred access type indication information comprising the satellite access mode;

determining whether to accept the preferred access type indication information; and based on determining to accept the preferred access type indication information, setting the satellite access mode in an access type preference component; and transmit the URSP to a terminal through a third network element.

12. An apparatus for data transmission in a 5G communication network, the apparatus comprising:

at least one memory configured to store program code; and at least one processor configured to read the program code and operate as instructed by the program code, the program code comprising:

first generating code configured to cause the at least one first processor of a first network element to generate a UE route selection policy (URSP), the URSP comprising a URSP rule, the URSP rule comprising a route selection descriptor (RSD), the RSD comprising satellite access indication information, and the satellite access indication information indicating a satellite access mode to access a core network, wherein the first generating code further comprises:

first receiving code configured to cause the at least one first processor to receive preferred access type indication information transmitted by a second network element, the preferred access type indication information comprising the satellite access mode;

first determining code configured to cause the at least one first processor to determine whether to accept the preferred access type indication information; and first setting code configured to cause the at least one first processor to set, based on determining to accept the preferred access type indication information, setting the satellite access mode in an access type preference component; and first transmitting code configured to cause the at least one first processor to transmit the URSP to a terminal through a third network element.

13. The apparatus of claim 12, wherein the RSD comprises a route selection component, the route selection component comprising the access type preference component, the access type preference component comprising the satellite access mode, and the satellite access indication information comprising the satellite access mode in the access type preference component.

14. The apparatus of claim 12, wherein the RSD comprises a route selection validation criterion parameter, wherein the route selection validation criterion parameter comprises a valid area parameter and a satellite access applicable area parameter, and wherein the satellite access applicable area parameter comprises applicable geographic area information of the satellite access mode, and wherein the satellite access indication information comprises the applicable geographic area information of the satellite access mode in the satellite access applicable area parameter.

15. The apparatus of claim 12, wherein the RSD comprises a route selection component, wherein the route selection component comprises a satellite access indication component, wherein the satellite access indication component comprises the satellite access mode, and wherein the satellite access indication information comprises the satellite access mode in the satellite access indication component.

16. The apparatus of claim 12, wherein the RSD comprises a route selection validation criterion parameter, wherein the route selection validation criterion parameter comprises a valid area parameter, wherein the valid area parameter comprises applicable geographic area information of the satellite access mode, and wherein the satellite access indication information comprises the applicable geographic area information of the satellite access mode in the valid area parameter.

17. The apparatus of claim 16, wherein the first generating code comprises:

second receiving code configured to cause the at least one first processor to receive the applicable geographic area information of the satellite access mode transmitted by the second network element; and second determining code configured to cause the at least one first processor to determine whether to accept the applicable geographic area information of the satellite access mode; and second setting code configured to cause the at least one first processor to set, based on determining to accept the applicable geographic area information of the satellite access mode, setting the applicable geographic area information of the satellite access mode in the valid area parameter.

18. The apparatus of claim 16, wherein the applicable geographic area information of the satellite access mode comprises at least one of:

a satellite access cell identity list, comprising a satellite access cell identity;

a cell identity list assigned by a base station; and geographic area information that is described by using a satellite positioning technology.

* * * * *